April 3, 1951  P. M. BOURDON  2,547,684
PLANT FOR THE CONTINUOUS MANUFACTURE OF ISOPRENE
Filed Feb. 8, 1949
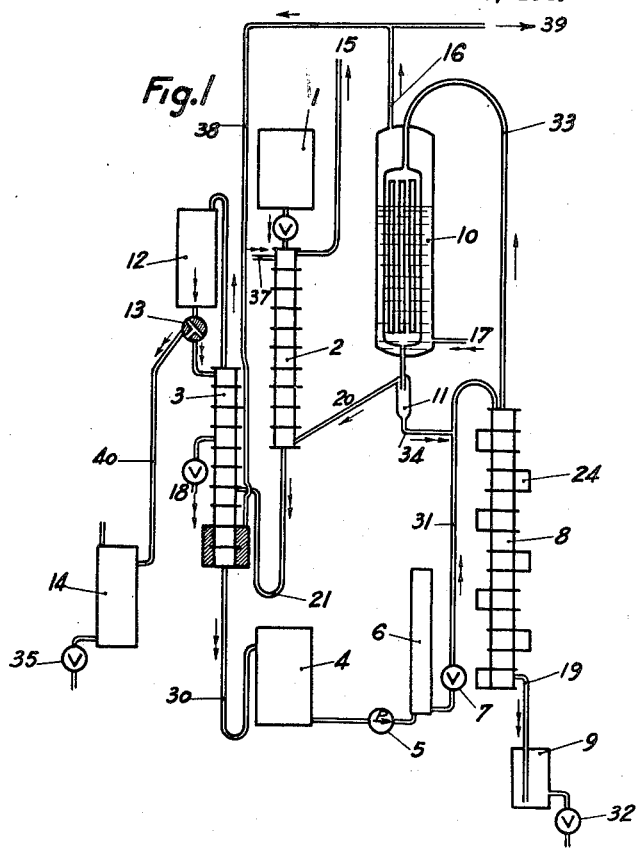
Fig./
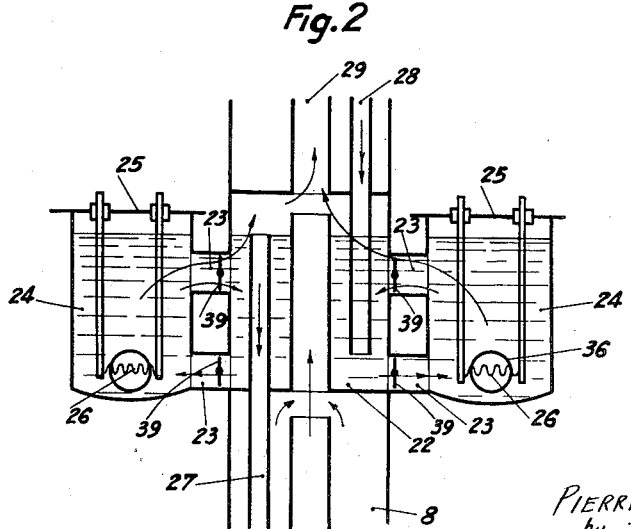
Fig.2
INVENTOR
PIERRE MARCEL BOURDON
by
Campbell, Brumbaugh, Free & Graves
his ATTORNEYS Patented Apr. 3, 1951

2,547,684

UNITED STATES PATENT OFFICE 2,547,684

PLANT FOR THE CONTINUOUS MANUFACTURE OF ISOPRENE

Pierre Marcel Bourdon, Paris, France, assignor to Manufacture de Caoutchouc Michelin (Puiseux, Boulanger & Cie) Clermont-Ferrand, France Application February 8, 1949, Serial No. 75,275
In France February 12, 1948

5 Claims. (Cl. 23—263)

1

The preparation of isoprene by the pyrolysis of terpene hydrocarbons (pinene, dipentene, limonene, and the like) has heretofore only been used on a laboratory scale. The various techniques which have been proposed for the industrial use of this process have been found to be useless owing to the low yield, the prohibitive power consumption or the difficulty of controlling the plant which has to be stopped frequently to remove the carbon which is accessorily formed.

The old technique of the heated surface immersed in the liquid hydrocarbon is the most advantageous from the industrial standpoint. It has however the following drawback: the production of isoprene rapidly decreases as the by-products accumulate in the liquid, thereby producing a correlative decrease in the yield to power consumption ratio. If, in order to maintain this ratio, arrangements are made to renew the liquid frequently, it becomes necessary to effect an additional treatment to recover the undecomposed fraction of the original hydrocarbon.

Our invention has for its object a continuously operating plant for carrying out this technique, said plant enabling these drawbacks to be obviated.

The technique which forms the basis of the invention comprises causing a liquid terpene hydrocarbon to flow in a continuous stream through successive stages in contact with surfaces which are heated to a calefaction temperature.

The plant according to the invention enables isoprene to be obtained by pyrolysis of a pinene intermediately passing through a dipentene, and it comprises in combination: a reservoir for the liquid pinene; a condensation column; a pipe for conveying the raw isoprene vapors to the base of said condensation column; a column for rectifying said raw isoprene and connected to the condensation column through a syphon; a condenser and a reservoir for the rectified isoprene; a pipe connecting said rectified isoprene reservoir and said condenser to the upper part of the rectifying column; a pipe extending from the lower part of said rectifying column and in which are interposed a regulating reservoir for the pinene and a high-pressure pump; an apparatus for the isomerisation of the pinene into dipentene; a plate column for converting said dipentene into isoprene by pyrolysis; a pipe connecting the isomerising apparatus to the plate column; a dephlegmator connected to the outlet of said plate column; a reservoir located under said dephlegmator for separating the isoprene vapors

2 and the liquid dipentene; a pipe connecting said reservoir to the inlet of the plate column; a pipe connecting said reservoir to the base of the aforesaid condensation column; a pipe for the escape of the steam issuing from said dephlegmator, and cocks or the like on the various reservoirs, columns and pipes, for controlling or collecting the vapors, the liquids or the condensation products.

The accompanying drawing shows diagrammatically and by way of example one embodiment of the invention.

In said drawing:

Fig. 1 is a diagram of the general arrangement of the plant.

Fig. 2 is a vertical section of a stage of the plate column according to the invention.

For using the plant which will now be described in greater detail, it is advantageous to take pinene α or limonene as a basic product. It will be assumed heerinafter that in practice oil of terpentine is used as a starting substance.

If reference is had to Fig. 1, it will be seen that the original oil of terpentine is contained in a reservoir 1 from which it flows into a column 2. The cold terpentine contained in the column 2 serves for dissolving and condensing the vapors of raw isoprene which are produced in the column 8, which will be described hereinafter, and which are conveyed through the tube 20. This operation is assisted by a stream of water at ordinary temperature (the coldest available) which is supplied through a pipe 37. At the top of the column 2 is provided a pipe 15 for the outlet of the uncondensable vapors which may possibly be used for some purpose. The liquid mixture or raw isoprene and pinene flows through the syphon 21 into a column 3 which is heated by steam preferably obtained from the outlet 16 of the dephlegmator 10 which will also be described hereinafter, said steam being supplied through a pipe 38. The raw isoprene is rectified in 3 by distillation (since it boils at 34° C.) and is condensed in the condenser 12; a cock 13 is adapted to regulate the return flow of the column 3, and a cock 18 enables the intermediate fractions of the distillation to be drawn off. The oil of terpentine that boils at about 156° C. does not distill and flows through the tube 30 into a reservoir 4. A high-pressure pump 5 then forces the terpentine into an apparatus 6 in which the pinene is isomerised into dipentene and which is preferably the autoclave described in the patent application filed on the same day as the present application in the United States under Serial No. 75,274, now abandoned.

Through the discharge valve 7, the liquid dipentene is supplied by the tube 31 to the top of the plate column 8 which will be described in greater detail hereinafter. A tube 19 (barometer tube from 8 to 10 metres high in the case in which the operation is effected at sub-atmospheric pressure) conveys the condensed heavy products into a reservoir 9 from which they can be removed through a cock 32. The isoprene vapors flow out at the top of the column 8 through the tube 33, into the dephlegmator 10. Said dephlegmator is preferably formed by the nest of tubes of a low-pressure boiler which is supplied with water at 17. The vapors carried into the dephlegmator comprise a mixture of isoprene and dipentene. The dipentene, the temperature of which is reduced to about 120° C., condenses as it vaporises the water which flows out at 16 in the form of steam and can thus be used through the pipe 39 or be conveyed to the column 3 through the pipe 38. The condensed dipentene is separated from the isoprene vapors in a reservoir 11 located below the dephlegmator and returns through the tube 34 to the column 8. The isoprene vapors follow the tube 29 towards the column 2 as hereinbefore stated, and after being rectified in 3 and condensed in 12, the liquid rectified isoprene is conveyed through the pipe 40 into a reservoir 14 in which it is collected and from which it can be drawn off through the cock 35.

In the drawing, the double arrows show the direction of the flow of the liquids and the single arrows the direction of flow of the gases or vapors.

The arrangement which has just been described has the advantage that the uncondensable gases which flow out through the pipe 15 only carry with them very slight traces of isoprene, and the use of the original terpentine as a solvent considerably simplifies the apparatus.

A more detailed description will now be given of the plate column which forms the chief apparatus of the plant according to the invention and one stage of which is shown in Fig. 2. This column is of the type which retains large quantities of liquid but in which there is no bubbling of the vapors. It is supplied with terpene hydrocarbon through the top. The number of plates is of little importance and may advantageously be limited to six or eight.

In Fig. 2 it can be seen that at each stage 22 of said column are welded, at suitable levels, large tubes 23 which open into receptacles 24 which are provided with removable and interchangeable lids 25 and in which electric resistances 26 are immersed in the liquid. A heavy current enables said resistances to be heated to calefaction temperature. Pyrolysis takes place and the isoprene formed is immediately cooled to the temperature of the surrounding liquid.

In an ordinary plate column intended for rectifying liquids, it is essential for the rising vapors to be in as intimate a contact as possible with the liquid which flows on to the plates. This contact is usually obtained by compelling the vapors to bubble successively through the liquids on each plate by means of foraminous caps. In order to avoid too great a pressure drop, the height of the bubbling is restricted to a minimum: the layer of liquid on each plate does not exceed a few centimeters.

In the case of the present invention, rectification is not required and the bubbling becomes unnecessary. On the other hand, it is necessary to produce on each plate a sufficiently large retention of liquid to ensure a suitable supply of the side receptacles 24, the depth of which has to be sufficient for the resistances 26 always to be immersed.

As can be seen in Fig. 2, each stage of the column proper comprises an annular chamber 22 into which penetrates a tube 28 extending from the stage above and a tube 27 leading to the stage below. The tube 27 is of such a height that the liquid contained in 22 reaches the level of the upper end of said tube, whereas the tube 28 penetrates into the liquid almost to the bottom of the chamber 22. Preferentially, two tubes 23 are provided, one at the bottom of the chamber 22 and the other slightly below the level of the liquid in said chamber. As in Fig. 1, the double arrows show the direction of flow of the liquids, and the single arrows that of the vapors. At the centre of the column is provided a chimney 29 through which escape the isoprene vapors that flow from the receptacles 24 through the chamber 22.

As hereinbefore stated, the receptacles 24 should be adapted to be isolated from the column 22 by means of cocks, which are diagrammatically shown at 39, when the resistances are being changed.

Above the plate column 8 is located a dephlegmator 10 (Fig. 1) or reflux cooler, the temperature of which has to be kept at a suitable value so as not to condense the isoprene vapors (boiling point 34° C.) while condensing the dipentene vapors (boiling point about 170° C.) In the case in which the operation is effected at atmospheric pressure, it is possible to condense the dipentene vapors at 120° C. for example and use them for vaporizing water as hereinbefore stated.

Inspection windows 36 mounted on the receptacles 24 enable the operation of the resistances to be checked visually. Furthermore, the electric power supplied to each circuit is checked by means of meters not shown. A suitable rate of operation corresponds to a dissipation of 40 to 50 watts per square centimetre of calefaction surface.

The resistances 26 slowly become coated with a very hard coke and have to be regenerated after one or two weeks of continuous operation. The regeneration does not involve stopping the plant: only the current flowing through the resistance involved is switched off and the resistance is quickly replaced by a fresh resistance which has been prepared on another lid 25. The resistance coated with carbon may be made fit to use again by roasting in air for example.

The use of successive plates produces a gradual exhaustion of the liquid, so that only a practically exhausted liquid is removed from the bottom of the column. It is important to control the temperature at this point so as to adjust the supply of the original terpene hydrocarbon in such a manner that only a practically exhausted liquid is removed. Only the bottom stage operates with a liquid which is poor in dipentene. Its production is very low, so that arrangements may advantageously be made for there to be no calefaction at that level, the electric power supplied nevertheless remaining sufficient to ensure the continuous recuperation by distillation of the remaining terpene hydrocarbon. The intense vaporization which takes place throughout the whole column during operation produces a constant and automatic replenishment of the liquids in the upper stages which thus operate under the most efficient conditions of power consumption.

With a slight modification, the plant can be made to operate at sub-atmospheric pressure: in this case, the dephlegmator 10 is followed by one or more steam ejectors which produce the desired vacuum. The use of a vacuum lowers the temperature of operation of the column, but does not substantially improve the efficiency.

By way of example of the results which can be obtained by means of the plant according to the invention, it may be mentioned that during a test, by directly supplying the plate column which has just been described with raw dipentene obtained by the thermic isomerisation of oil of maritime pine, the following yields were obtained:

| | Percent |
|---|---|
| Rectified isoprene | 48 |
| Heavy fractions | 42 |
| Intermediate fractions | 16 |
| Gas | 13 |

In this case, the production of 1 kg. of isoprene requires a consumption of 20 kwh., but by using as a dephlegmator, as hereinbefore described, the nest of tubes of a low-pressure boiler, a larger part of the power used can be recovered in the form of steam which can be used, inter alia, for rectifying the raw isoprene in the column 3 as hereinbefore mentioned.

The nature of the electric resistances 26 has no effect on the efficiency. Use may be made of the commercial alloys that withstand carburizing or of graphite.

What we claim is:

1. In an apparatus for the conversion of pinene into isoprene, the combination of a reservoir for liquid pinene, means to isomerize pinene into dipentene connected to said reservoir and having a discharge outlet, a column including a plurality of superimposed plates, means to supply dipentene from said outlet to the uppermost plate, each plate comprising an annular chamber, lateral separate receptacles connected to this annular chamber, valves interposed between said chamber and said separate receptacles, electrical resistances in said lateral receptacles for direct contact with the liquid therein to convert said dipentene into isoprene, overflow pipes connecting each annular chamber to the chamber below it to maintain the liquid in the chamber at substantially a predetermined level, and a central chimney extending through each annular chamber at about the axis thereof to a point above the level of the overflow pipe to permit substantially free flow of the vapors upwardly through said column, a vapor outlet at the upper end of said column, means to collect liquid at the bottom of said column, condensing means connected to the vapor outlet of said column for condensing the vapors, rectifying and condensing means connected to the outlet of the first-mentioned condensing means, and means to collect the condensed liquid at the outlet of the second-mentioned means.

2. In an apparatus for the conversion of pinene into isoprene, the combination of a reservoir for liquid pinene, autoclave means for isomerizing the pinene into dipentene connected to the outlet of said reservoir, a column having a plurality of plates therein in vertically spaced relation, means to discharge dipentene from said autoclave means to the uppermost of said plates, each plate comprising an annular chamber, a laterally disposed receptacle connected to said annular chamber, a valve interposed between said laterally disposed receptacle and said annular chamber, electrical resistances in said lateral receptacle for heating the liquid contained in these receptacles by direct contact to convert the dipentene into isoprene, overflow pipes for connecting each annular chamber to the chamber below it and a central chimney extending through each annular chamber at about the axis thereof nearly up to the bottom of the annular chamber above it and having its upper end above the level of the upper end of its corresponding overflow pipe; a vapor outlet at the upper end of said column, means for collecting the liquid at the bottom of this column, a dephlegmator comprising a low-pressure tube-type boiler, means to feed water to said boiler, means connecting the vapor outlet of said column to the boiler tubing, a condensation tank connected to the boiler tubing and located below the level thereof, a return pipe from the bottom of said tank to the upper part of said column to return to said column the liquid condensed in said dephlegmator, a rectifying column, means connecting the upper part of said condensation tank to said rectifying column to convey thereinto uncondensed vapors discharged from said dephlegmator, a condenser connected to said rectifying column and adapted to condense the vapors discharged therefrom, and means for collecting liquid at the outlet of this condenser.

3. An apparatus for the conversion of pinene into isoprene, which comprises in combination a supply reservoir for liquid pinene, autoclave means to receive liquid pinene from said reservoir for isomerizing the pinene into dipentene, a pump for conveying the liquid from said reservoir to said autoclave means, a plate column, means to supply liquid from the autoclave means to the upper part of said column, said plate column having a plurality of plates therein in vertically spaced relation, each plate comprising an annular chamber, lateral receptacles connected to this annular chamber, electrical resistances in these lateral receptacles for direct contact with liquid therein to heat the liquid and convert the dipentene into isoprene, overflow pipes connecting each annular chamber to the chamber below it, and a central chimney extending through each annular chamber at about the axis thereof to a point above the level of the upper end of the corresponding overflow pipe and nearly up to the bottom of the annular chamber located above it to permit upward free flow of vapors; a vapor outlet at the upper end of said column, means for collecting the liquid at the bottom of said column, a dephlegmator comprising a nest of tubes and a boiler shell enclosing said tubes, means to supply cooling water to said shell, means connecting the vapor outlet of said column to said tubes, a tank connected to the outlet of said tubes to receive condensed liquid therefrom and located below the level of said outlet, a return pipe connecting the bottom of said tank to the upper end of said column to return liquid to said column from said tank, a condensing column, a tank for crude pinene connected to the upper part of said condensing column, a pipe connecting the upper part of said condensing tank at the outlet of the dephlegmator to the lower part of said condensing column to convey thereinto vapors discharged from said dephlegmator tubes, whereby the pinene flowing downward through the condensing column dissolves and condenses the vapors issuing from the dephlegmator, a rectifying column, a syphon connecting the lower part of the condensing column to an intermediate point of the rectifying column, means to supply steam to said rectifying column to heat same, a condenser at the top of said rectifying column, a reservoir connected to said condenser to receive condensate therefrom and a pipe connecting the lower end of said rectifying column to said supply reservoir.

4. An apparatus for converting dipentene into isoprene, which comprises a plate column having an inlet for liquid dipentene and an outlet for vapors at its upper end, said column having a plurality of partitions therein in vertically spaced relation dividing it into a plurality of chambers, horizontally extending passages connected to each chamber, laterally positioned receptacles connected to said passages, electrical resistances in said lateral receptacles for direct contact with liquid in said chambers to heat the liquid therein, overflow pipes connecting each chamber to a chamber below it, a central chimney extending through each annular chamber at about the axis thereof and terminating in an open end above the level of the upper end of the corresponding overflow pipe to permit free flow of vapors from one chamber to another, a vapor outlet at the upper end of said column, and means for collecting the liquid at the bottom of this column, the uppermost chamber being connected to said inlet and the central chimney of this plate being connected to the vapor outlet.

5. A plate column in accordance with claim 4 which comprises removable caps for the lateral receptacles of each plate, the electrical resistances being carried by said caps in a manner so as to be located close to the bottom of said lateral receptacles, and sightholes of transparent material provided in the front of each electrical resistance.

PIERRE MARCEL BOURDON.

REFERENCES CITED

The following references are of record in the file of this patent:

UNITED STATES PATENTS

| Number | Name | Date |
|---|---|---|
| 518,429 | Solvay | Apr. 17, 1894 |
| 1,603,851 | Lummus | Oct. 19, 1926 |
| 1,942,767 | Oman et al. | Jan. 9, 1934 |
| 1,986,165 | Sieck | Jan. 1, 1935 |
| 1,991,955 | Ralston | Feb. 19, 1935 |

OTHER REFERENCES

Canadian Journal of Research, vol. 6, 1932, pages 210–214.